B. E. THOMAS.
FLEXIBLE COUPLING.
APPLICATION FILED MAR. 12, 1918.
1,323,423.  Patented Dec. 2, 1919.
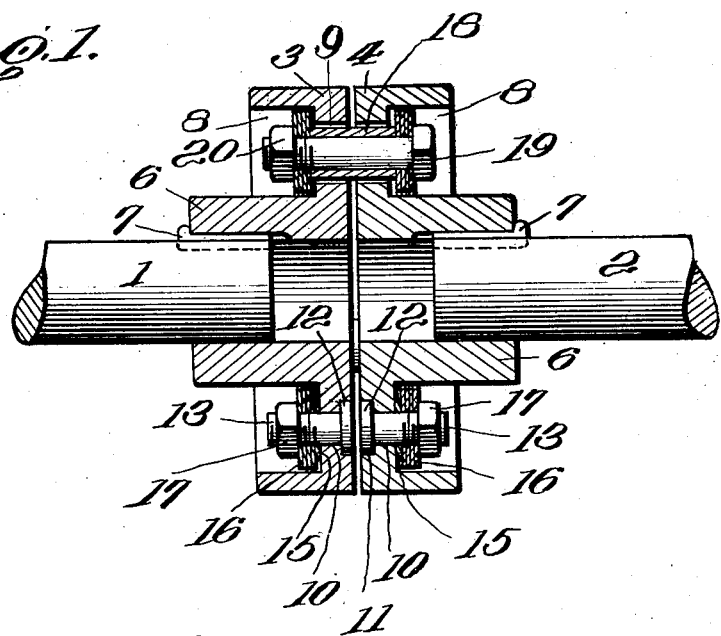
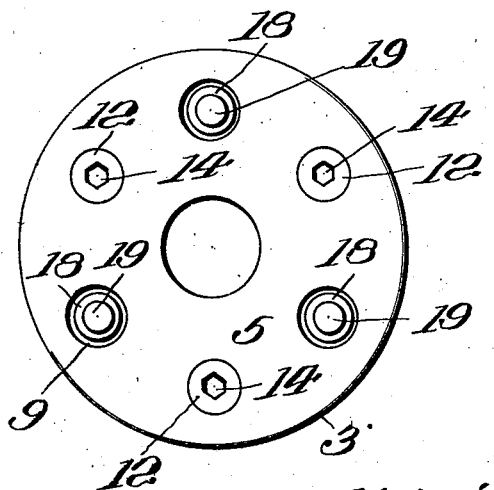
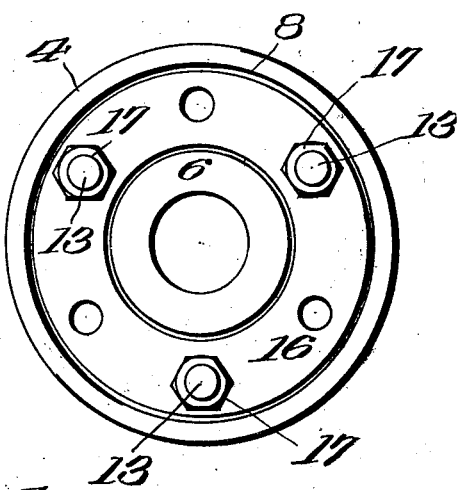
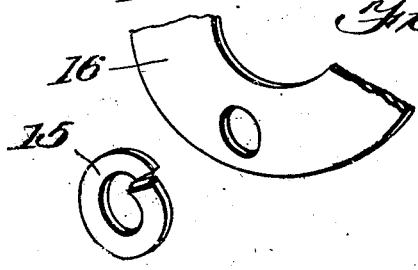
Inventor
B. E. Thomas.

UNITED STATES PATENT OFFICE.

BERTHA E. THOMAS, OF ERIE, PENNSYLVANIA.

FLEXIBLE COUPLING.

1,323,423.   Specification of Letters Patent.   Patented Dec. 2, 1919.

Application filed March 12, 1918. Serial No. 221,892.

*To all whom it may concern:*

Be it known that I, BERTHA E. THOMAS, a citizen of the United States, residing at Erie, in the county of Erie and State of Pennsylvania, have invented certain new and useful Improvements in Flexible Couplings, of which the following is a specification, reference being had therein to the accompanying drawing.

This invention relates to certain new and useful improvements in flexible shaft couplings, the object being to provide a coupling by means of which power can be transmitted from one shaft to another when said shafts are out of line or out of center.

Another object of my invention is to provide a flexible shaft coupling which is exceedingly simple and cheap in construction and one which can be utilized to transmit power in either direction of rotation and one which is especially adapted to be used for connecting shafts which are driven at a high rate of speed.

Another object of my invention is to provide a flexible shaft coupling which is so constructed that all shock is eliminated in transmitting power from one shaft to the other.

Other and further objects and advantages of the invention will be hereinafter set forth and novel features thereof defined by the appended claims.

In the drawing:

Figure 1 is a vertical longitudinal section through the complete coupling;

Fig. 2 is an elevation of the inner face of one of the coupling members;

Fig. 3 is an elevation of the outer face of one of the coupling members; and

Fig. 4 is a perspective view of a portion of one of the flexible rings and washer.

Like numerals of reference refer to like parts in the several figures of the drawings.

Referring to the drawing 1 and 2 represent respectively a driven and a driving shaft which are mounted in suitable bearings not shown. Mounted on the shafts 1 and 2 are duplicate circular coupling members 3 and 4 which are formed exactly alike, and the description of one will be sufficient for both.

Each coupling member is provided with a flat inner face 5 and a hub 6 on its outer face in which the shaft is secured by a key 7, and while in the drawing I have only shown the shaft extending partly into the coupling member, I do not wish to limit myself to any particular manner of securing the shaft within the coupling member, but by the construction shown the coupling members 3 and 4 can be placed in position on the ends of a pair of shafts to be coupled without removing said shafts from their bearings.

The outer face of each coupling member is provided with an annular groove 8 surrounding the hub, as clearly shown in Fig. 3, and each coupling member is provided with an annular series of openings 9 and 10, the openings 9 having a diameter greater than the diameter of the openings 10 for the purpose hereinafter fully described. The openings 10 are surrounded at their inner ends by annular recesses 11 forming seats for the heads 12 of the bolts 13 which extend into the annular recesses as clearly shown. The heads 12 of the bolts 13 are provided with key receiving recesses 14 in which a key can be placed for preventing the bolts from rotating within the recesses.

It will be noted that the openings 9 and 10 are alternately arranged, one of the openings 10 being arranged between each pair of openings 9. Mounted on the bolts 13 are flexible washers 15 for holding a laminated flexible ring 16 spaced from the bottom of the annular recess of the coupling member, and this laminated ring is provided with openings in alinement with the openings 9 and 10 of the coupling member. After the laminated ring has been placed in position upon the bolts 13, the same is secured thereon by nuts 17 so as to securely fasten the ring to the coupling member in spaced relation to the walls of the annular recess. As each of the coupling members is provided with a laminated ring secured in position thereon by bolts, each coupling member is complete in itself and can be removed as a unit or placed in position upon the shaft as a unit.

In connecting a pair of shafts with my improved construction of flexible coupling so that power can be transmitted from one shaft to the other, a coupling member is placed on the end of each of the shafts to be connected and bolts 19 are forced through the openings of the laminated ring and the openings 9 of one coupling member. A sleeve 18 is then placed on each of the bolts 19 which has a diameter less than the diameter of the opening 9 and the protruding ends of the sleeves and bolts are forced into and through the openings 9 of the other coupling member, and the nuts 20 are placed on the bolts and screwed into engagement with the adjacent laminated ring which binds the two flexible rings together in order to allow the coupling members to assume an angular position in respect to each other.

In the drawing I have shown the sleeves 18 formed of a single section, but it is of course understood that these sleeves can be formed of sections and mounted on the bolts 19 as the length of the sleeves determine the distance that the inner faces of the coupling members will be spaced apart, and in the drawing I have shown the coupling members slightly spaced apart in order to allow the members to assume an angular position without affecting the transmission of power. The ends of the sleeves 18 carried by the bolts 19 engage the inner faces of the laminated rings carried by the respective coupling members and with the bolts connect the coupling members together in such a manner that a flexible coupling is produced which will allow the shafts to be coupled when they are out of line or out of center.

In the construction herein shown, the bolts 19 are alternately arranged with the bolts 13 and the axis of the openings 9 and 10 are parallel to the axis of the coupling members.

From the foregoing description it will be seen that I have provided a flexible shaft coupling which is exceedingly simple and cheap in construction, the same being composed of a pair of coupling members, each coupling member carrying a laminated ring on the outer face thereof and spaced therefrom, the laminated rings being connected together by bolts in such a manner that a shaft coupling is produced which eliminates shock in transmitting power from one shaft to the other and at the same time the desired result is obtained.

I claim:

1. A flexible shaft coupling, comprising a pair of coupling members adapted to be secured to the ends of the shafts to be connected, a flexible ring arranged on the outer faces of each coupling member and spaced therefrom, and means for alternately securing said rings together and to the respective coupling members.

2. A flexible shaft coupling, comprising a pair of circular coupling members adapted to be secured on the ends of the shafts to be connected, said coupling members being provided with hub portions on the outer faces, a flexible ring arranged on the outer face of each of said coupling members around said hub and spaced therefrom, bolts connecting said flexible rings to the coupling members and bolts passing through said coupling members and connecting said flexible rings together.

3. A flexible shaft coupling, comprising a pair of duplicate coupling members adapted to be secured on the ends of the shafts to be connected, said coupling members being provided with openings, a laminated flexible ring arranged on the outer face of each of said coupling members having openings registering with the openings thereof, and bolts arranged in said openings for alternately connecting said laminated rings together and said rings to the respective coupling members.

4. A flexible shaft coupling, comprising a pair of duplicate coupling members adapted to be connected, a flexible laminated ring arranged on the outer face of each of said coupling members and spaced therefrom, bolts for securing said rings to the outer face of each of said coupling members and bolts passing through said coupling members for connecting the respective flexible rings together, said bolts carrying sleeves having their ends in engagement with said flexible rings.

5. In a shaft coupling, the combination of coupling members adapted to be attached to the shaft sections to be connected laminated flexible rings arranged on the outer faces of each of said coupling members and secured thereto, and bolts passing longitudinally through said coupling members carrying sleeves having their ends in engagement with the flexible rings of said coupling members.

6. A flexible shaft coupling, comprising a pair of duplicate circular coupling members having flat inner faces and adapted to be secured on the ends of the shafts to be connected, said coupling members being provided with an annular series of openings having their axis parallel to the axis of the coupling members, a flexible ring secured on the outer face of each of said coupling members and spaced therefrom, and bolts passing through the openings of said coupling members carrying sleeves having their ends in engagement with said flexible rings.

7. A flexible shaft coupling, comprising a pair of coupling members, each coupling member having a flexible laminated ring secured on the outer face thereof and spaced therefrom, bolts for connecting the flexible rings of the two coupling members together, and sleeves carried by said bolts having their ends in engagement with said flexible rings.

8. A flexible shaft coupling, comprising a pair of duplicate circular coupling members having flat inner faces and adapted to be secured on the ends of shafts to be connected, said coupling members having annular recesses on the outer faces, flexible laminated rings arranged in the recesses of said coupling members and spaced from the walls thereof, said coupling members being provided with registering openings and bolts carrying sleeves loosely mounted in said openings for connecting the flexible rings of the two coupling members together, said sleeves having their ends in engagement with the inner faces of said rings.

In testimony whereof I hereunto affix my signature in the presence of two witnesses.

BERTHA E. THOMAS.

Witnesses:
 MAE SILSBY,
 VIRGINIA THOMAS.